(12) United States Patent
Smeikle

(10) Patent No.: US 9,328,531 B1
(45) Date of Patent: May 3, 2016

(54) RECHARGEABLE AUTOMOBILE IGNITION KEY

(71) Applicant: Everald Lloyd Smeikle, Regina (SK)

(72) Inventor: Everald Lloyd Smeikle, Regina (SK)

( * ) Notice: Subject to any disclaimer, the term of this patent is extended or adjusted under 35 U.S.C. 154(b) by 65 days.

(21) Appl. No.: 14/510,879

(22) Filed: Oct. 9, 2014

(51) Int. Cl.
*B60R 25/10* (2013.01)
*E05B 19/00* (2006.01)
*B60R 25/102* (2013.01)

(52) U.S. Cl.
CPC ............... *E05B 19/00* (2013.01); *B60R 25/102* (2013.01)

(58) Field of Classification Search
None
See application file for complete search history.

(56) References Cited

U.S. PATENT DOCUMENTS

| 5,003,801 | A  | * | 4/1991  | Stinar    | G07C 9/00182 70/278.3 |
| 6,457,337 | B1 | * | 10/2002 | Hattick   | G07C 9/00944 70/278.3 |
| 8,841,987 | B1 | * | 9/2014  | Stanfield | G07C 9/00896 340/5.61 |

* cited by examiner

*Primary Examiner* — Ojiako Nwugo
(74) *Attorney, Agent, or Firm* — Williams Intellectual Property; Benjamin F. Williams

(57) ABSTRACT

A rechargeable automobile ignition key having a conductive shank insertible into an automobile ignition system port to enable convenient recharge of a key body during normal operation of an automobile, whereby said key body remains usable for remote operation of a locking system of said automobile and effects remote sounding of an alarm signal when an automobile alarm is sounded, the alarm signal thereby alerting a user that the particular automobile alarm is sounding, even when said user is remotely disposed potentially outside of an audible range of said automobile alarm.

6 Claims, 4 Drawing Sheets

RECHARGEABLE AUTOMOBILE IGNITION KEY

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of rechargeable automobile ignition key are known in the prior art. However, what is needed is a rechargeable automobile ignition key that includes a conductive shank insertible into an automobile ignition system port to enable convenient recharge of a key body during normal operation of an automobile, whereby said key body remains usable for remote operation of a locking system of said automobile and effects remote sounding of an alarm signal when an automobile alarm is sounded, the alarm signal thereby alerting a user that the particular automobile alarm is sounding, even when said user is remotely disposed potentially outside of an audible range of said automobile alarm.

FIELD OF THE INVENTION

The present invention relates to a rechargeable automobile ignition key, and more particularly, to a rechargeable automobile ignition key that includes a conductive shank insertible into an automobile ignition system port to enable convenient recharge of a key body during normal operation of an automobile, whereby said key body remains usable for remote operation of a locking system of said automobile and effects remote sounding of an alarm signal when an automobile alarm is sounded, the alarm signal thereby alerting a user that the particular automobile alarm is sounding, even when said user is remotely disposed potentially outside of an audible range of said automobile alarm.

SUMMARY OF THE INVENTION

The general purpose of the rechargeable automobile ignition key, described subsequently in greater detail, is to provide a rechargeable automobile ignition key which has many novel features that result in a rechargeable automobile ignition key which is not anticipated, rendered obvious, suggested, or even implied by prior art, either alone or in combination thereof.

The present rechargeable automobile ignition key has been devised to enable convenient recharge of a key body during normal operation of an automobile whereby said key body remains usable for remote operation of a locking system of said automobile and effects remote sounding of an automobile alarm to alert a user, even when said user is remotely disposed relative the particular automobile, and potentially outside of an audible range of said automobile alarm, that the automobile alarm is concurrently sounding.

The present rechargeable automobile ignition key, therefore, includes a key body having a head and a shank. The term "head", as used herein, is taken to include an anterior end of a handheld device manually operable to effect opening, closing, and ignition of an automobile. The term "shank", as used herein throughout, is taken to include any posterior end of a handheld device manually operable to effect opening, closing, and ignition of an automobile, whereby said posterior end is insertible into an ignition system port of an automobile.

A transceiver is disposed within the key body, said transceiver disposed in wireless communication with a locking system of an automobile. Depression of at least one button, disposed upon the key body, is disposed to engage and disengage said locking system, whereby operation of the automobile locking system is effective remotely.

A speaker is disposed upon the key body. The speaker is disposed in circuit with the transceiver whereby an automobile alarm sounded by the particular automobile is relayed to the speaker for activation of an alarm signal therefrom, whereby a user is alerted to the sounding of the automobile alarm even if remotely disposed relative the particular automobile itself, or out of audible range of the automobile alarm.

A second button is disposed upon the key body to enable remote opening of a trunk of the automobile, as desired, and a third button is disposed upon the key body to enable manual activation of the automobile alarm, as desired.

The shank of the key body is enabled to conduct electrical energy whereby the key body is rechargeable to maintain power for operation of the at least one button, the second button, the third button, the transceiver, and the speaker. When the shank of the key body is removably inserted into an ignition system port disposed interior to the automobile, and the automobile is started, electrical energy is conducted to recharge the key body whereby future use of the key body to effect remote operation of the automobile locking system, trunk opening, and alarm sounding, is enabled.

Thus has been broadly outlined the more important features of the present rechargeable automobile ignition key so that the detailed description thereof that follows may be better understood and in order that the present contribution to the art may be better appreciated.

Objects of the present rechargeable automobile ignition key, along with various novel features that characterize the invention are particularly pointed out in the claims forming a part of this disclosure. For better understanding of the rechargeable automobile ignition key, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
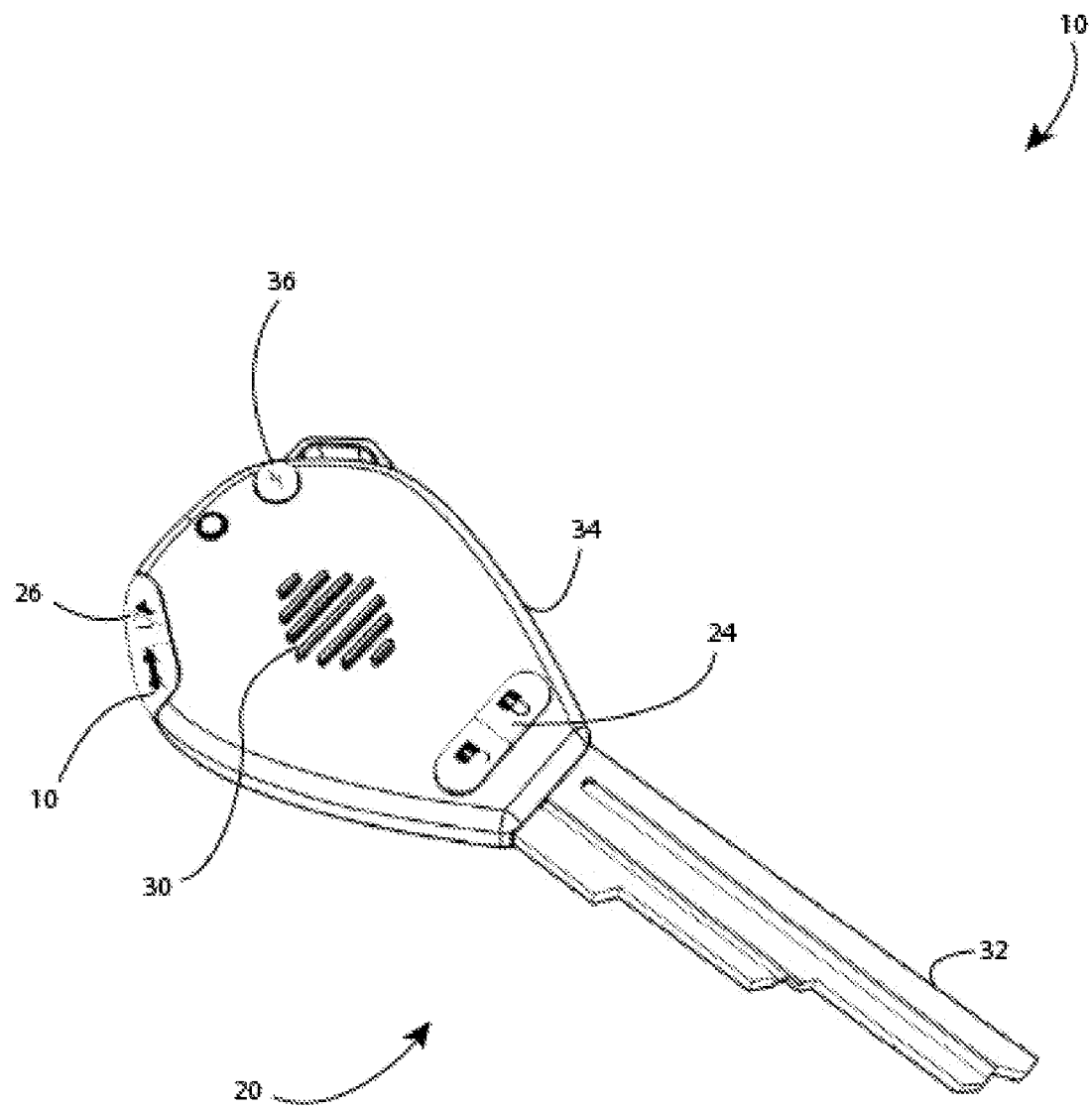
FIG. 1 is an isometric view of an embodiment of a key body.
Figure 2:
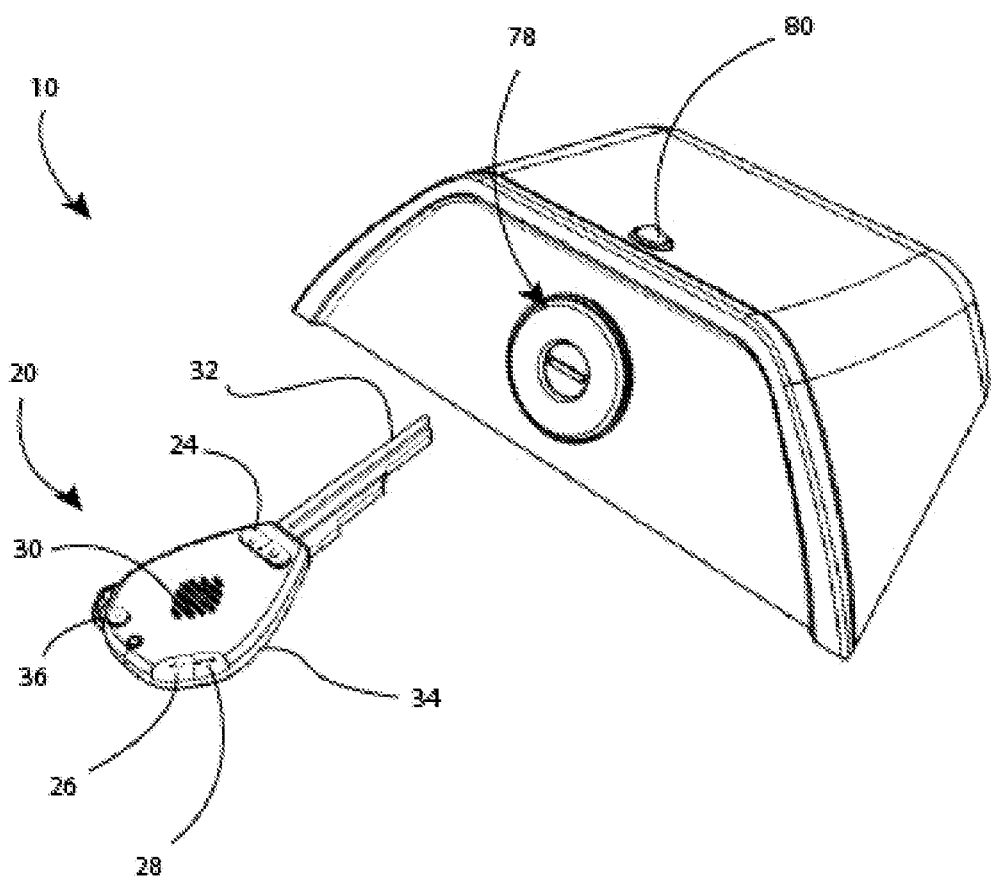
FIG. 2 is an isometric view of an embodiment.
Figure 3:
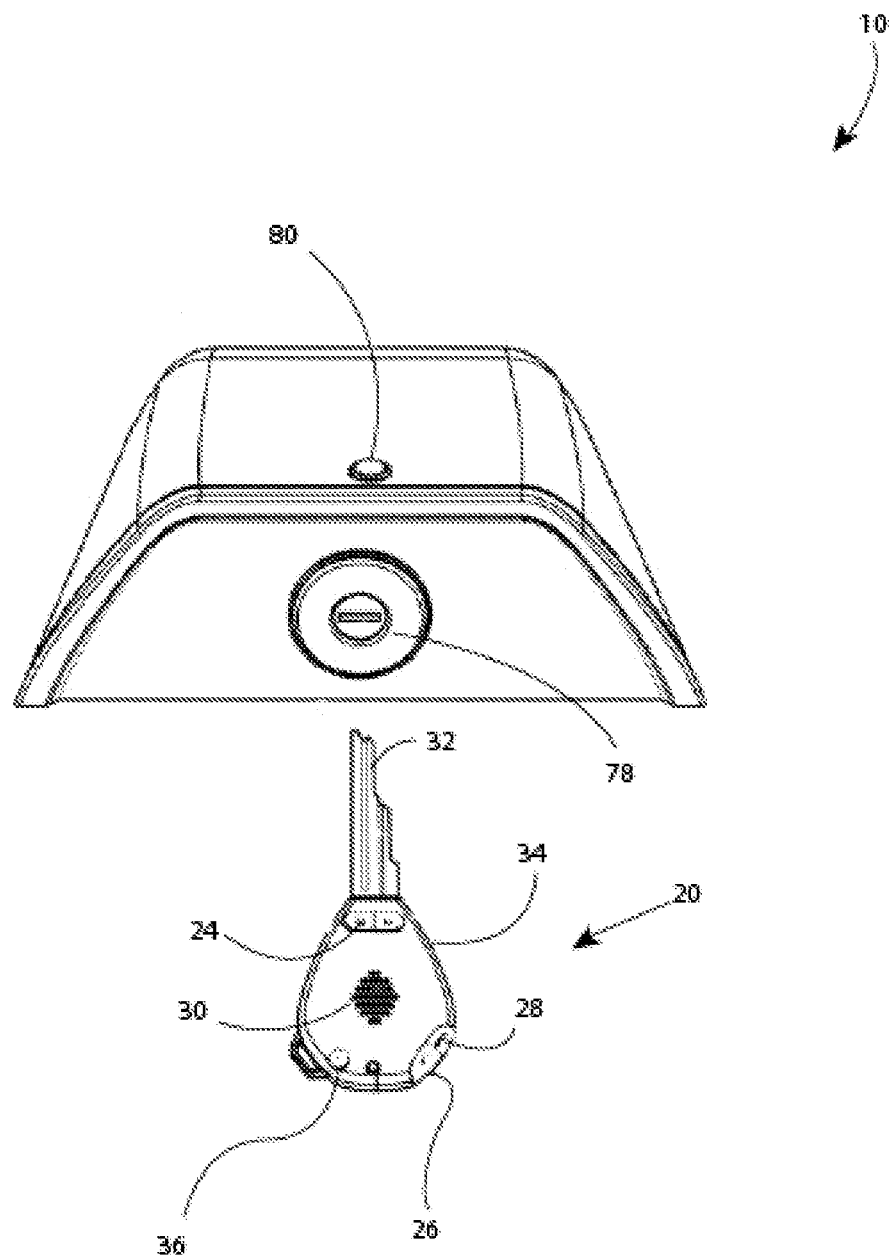
FIG. 3 is a front view of an embodiment.
Figure 4:
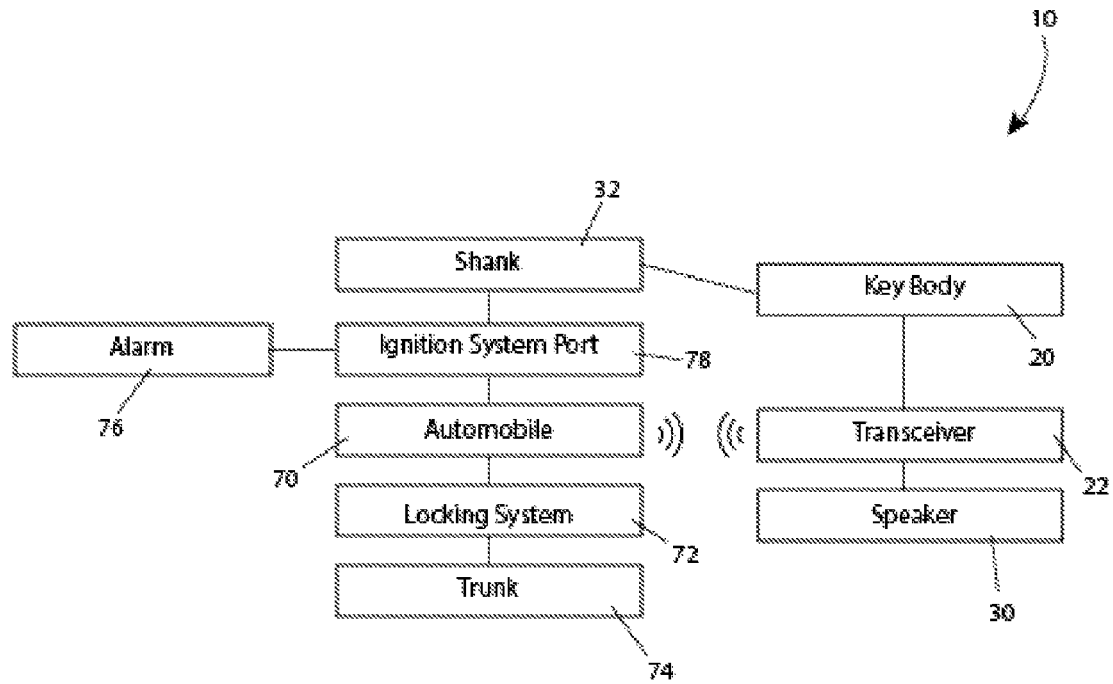
FIG. 4 is a block diagram.

With reference now to the drawings, and in particular FIGS. 1 through 3 thereof, example of the instant rechargeable automobile ignition key employing the principles and concepts of the present rechargeable automobile ignition key and generally designated by the reference number 10 will be described.

Referring to FIGS. 1 through 3 a preferred embodiment of the present rechargeable automobile ignition key 10 is illustrated.

The term "key", as used herein throughout, is taken to include any handheld, portable body enabling activation of an automobile's ignition system. The term "key", therefore, includes embodiments not depicted, including bladeless keys. The term "shank", therefore, as used herein throughout is taken to any posterior structure of a key body enabled disposition interior to an ignition system port. The term "head", as used herein throughout, is taken to include any anterior structure disposed to protrude outwards from an ignition system port after disposition of the shank therein. The "head", therefore, includes any structure of a key body which is graspable by a user to insert of remove said key from an ignition system port.

The present rechargeable automobile ignition key 10 has been devised to enable recharging of a key body 20 during normal operation of an automobile whereby wireless communication between said key body 20 and a locking system of an automobile is maintainable and a speaker 30, disposed within a head 34 of the key body 20, is wirelessly operable to signal an automobile alarm 76 remotely to a user whereby said user is notified of the sounding of the automobile alarm 76 even when said user is remotely disposed relative the particular automobile 70.

The rechargeable automobile ignition key 10, therefore, includes a transceiver 22 disposed interior to a key body 20, said transceiver 22 disposed in wireless communication with a locking system 72 of an automobile 70. At least one button 24 is depressible upon the key body 20 to engage and disengage said locking system 72 remotely.

A second button 26 is disposed upon the key body 20, said second button 26 depressible to automatically open a trunk 74 of the automobile 70 and a third button 28 is likewise disposed and depressible to sound an automobile alarm 76, as desired.

A speaker 30 is disposed upon the key body 20, said speaker 30 remotely operable to sound an alarm signal 50 when said automobile alarm 76 is sounded. A user is therefore alerted to the sounding of the automobile alarm 76, even when said user is remotely disposed relative the automobile 70, whereby immediate corrective action is executable by the user to address the sounding of the alarm 76 even if said user should be disposed outside an audible range of said particular automobile alarm 76.

The speaker 30 sounds the alarm signal 50 independent of the automobile alarm 76. Thus, deactivation of the automobile alarm 76 effected by means other than by the instant key 10 will not deactivate the alarm signal 50 sounded by the speaker 30 disposed upon the key body 20. Thus, for example, should a thief successfully disengage the automobile alarm 76 interior to the automobile 70, said thief will have no effect upon the sounding of the alarm signal 50 as relayed by the key body.

A shank 32, connectable in circuit when the key body 20 is disposed into an ignition system port 78 interior to the automobile 70, enables conductivity of electrical energy to recharge said key 10 for future use. Disposition of the key body 20, therefore, interior to the ignition system port 78 enables recharging of the key body 20 for future use.

A first Light Emitting Diode ("LED") 80 disposed upon the ignition system port 78 may illuminate a color change indicative the key body 20 is fully charged, when the shank 32 is inserted into the ignition system port and the automobile 70 is operated in the normal manner. A second Light Emitting Diode ("LED") 36 disposed upon the head 34 of the key body 20 may also illuminate a color change indicative the key body 20 is in need of recharging.

Thus, the rechargeable automobile ignition key 10 is rechargeable during regular operation of an automobile 70 and wirelessly operable to engage and disengage the locking system 72, open the trunk 74, and sound the automobile alarm 76, as desired.

What is claimed is:

1. A rechargeable automobile ignition key comprising a conductive shank insertible into an automobile ignition system port to enable convenient recharge of a key body during normal operation of an automobile, whereby said key body remains usable for remote operation of a locking system of said automobile and effects remote sounding of an alarm signal when an automobile alarm is sounded, the alarm signal thereby alerting a user that the particular automobile alarm is sounding, even when said user is remotely disposed potentially outside of an audible range of said automobile alarm.

2. A rechargeable automobile ignition key comprising a transceiver disposed interior to a key body, said transceiver disposed in wireless communication with a locking system of an automobile, said key body thereby operable to remotely engage and disengage said automobile's locking system when at least one button, disposed upon a head of the key body, is depressed, said key body including a conductive shank enabling recharge of the key body when said shank is inserted into an ignition system port during regular operation of said automobile, wherein the key body is rechargeable for future use during regular operation of the automobile.

3. The rechargeable automobile ignition key of claim 2 further comprising a speaker disposed upon the key body, said speaker remotely operable when an automobile alarm sounds wherein said automobile alarm is independently signaled to a user through the key body.

4. The rechargeable automobile ignition key of claim 3 wherein the key body further comprises a second button depressible to automatically open the trunk of said automobile.

5. The rechargeable automobile ignition key of claim 4 wherein the key body further comprises a third button depressible to sound the automobile alarm.

6. A rechargeable automobile ignition key comprising:
   a key body;
   a transceiver disposed in wireless communication with a locking system of an automobile;
   at least one button depressible to engage and disengage said locking system;
   a second button depressible to automatically open a trunk of the automobile;
   a third button depressible to sound an automobile alarm;
   a speaker remotely operable to signal the automobile alarm when said automobile alarm is sounded; and
   a shank connectable in circuit when the key is disposed into an ignition system port to recharge said key for future use;
   wherein the rechargeable automobile ignition key is rechargeable during regular operation of an automobile and wirelessly operable to engage and disengage the locking system, open the trunk, and sound the automobile alarm, as desired.

* * * * *